United States Patent
Voros et al.

(10) Patent No.: US 8,701,037 B2
(45) Date of Patent: Apr. 15, 2014

(54) TURBO-SCROLL MODE FOR RAPID DATA ITEM SELECTION

(75) Inventors: Kristina M. Voros, Redmond, WA (US);
Suzan Marashi, Kirkland, WA (US);
Veronica Y. Law, Seattle, WA (US);
Marc S. Oshiro, Seattle, WA (US);
Christen E. Coomer, Seattle, WA (US);
Frederic Azera, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1553 days.

(21) Appl. No.: 11/823,442

(22) Filed: Jun. 27, 2007

(65) Prior Publication Data

US 2009/0007007 A1 Jan. 1, 2009

(51) Int. Cl.
*G06F 3/048* (2013.01)

(52) U.S. Cl.
USPC ............ 715/786; 715/784; 715/781; 715/764

(58) Field of Classification Search
USPC ........... 715/786, 768, 784, 781, 764; 345/173
See application file for complete search history.

(56) References Cited

U.S. PATENT DOCUMENTS

| | | | |
|---|---|---|---|
| 5,903,267 A | 5/1999 | Fisher | |
| 6,021,418 A | 2/2000 | Brandt et al. | |
| 6,172,685 B1 | 1/2001 | Pandit | |
| 6,292,188 B1 | 9/2001 | Carlson et al. | |
| 6,425,129 B1 * | 7/2002 | Sciammarella et al. | 725/38 |
| 6,473,104 B1 | 10/2002 | Harris | |
| 6,721,953 B1 * | 4/2004 | Bates et al. | 725/39 |
| 6,857,128 B1 | 2/2005 | Borden, IV et al. | |
| 6,981,227 B1 * | 12/2005 | Taylor | 715/768 |

(Continued)

FOREIGN PATENT DOCUMENTS

| WO | 2006/119269 A2 | 11/2006 |
|---|---|---|
| WO | WO2007037237 A1 | 4/2007 |

OTHER PUBLICATIONS

"Digital Lifestyle Outfitters HomeDock Deluxe for iPod", http://www.amazon.com/Digital-Lifestyle-Outfitters-HomeDock-Deluxe/dp/B000NOMODE.

(Continued)

*Primary Examiner* — Tadeese Hailu
*Assistant Examiner* — Darrin Hope
(74) *Attorney, Agent, or Firm* — Micah Goldsmith; Glen Johnson; Micky Minhas

(57) ABSTRACT

Described is a scrolling technology including a turbo-scroll mode that is automatically entered to increase the rate of scrolling through a set of items, (e.g., media content). The turbo-scroll mode may be triggered by holding down a scroll button for a period of time. In the turbo-scroll mode, visual cues are provided to assist the user in knowing a current relative position within the set of items. The visual cues may correspond to text metadata, such as letters indicative of an alphabetic position of scrolling, displaying a list or filtered sub-list of label data for items proximate the scroll position, a graphical position indicator, a channel indicator or time indicator for an electronic program guide, fading the electronic program guide into a background representation thereof, and/or providing at least two letters indicative of an alphabetic position of scrolling through the items.

20 Claims, 7 Drawing Sheets

(56) References Cited

U.S. PATENT DOCUMENTS

| | | | |
|---|---|---|---|
| 7,055,104 B1* | 5/2006 | Billmaier et al. | 715/765 |
| 7,103,851 B1 | 9/2006 | Jaeger | |
| 2002/0080195 A1 | 6/2002 | Carlson et al. | |
| 2002/0109709 A1* | 8/2002 | Sagar | 345/705 |
| 2003/0076301 A1 | 4/2003 | Tsuk et al. | |
| 2004/0077381 A1* | 4/2004 | Engstrom | 455/566 |
| 2005/0097601 A1 | 5/2005 | Danker et al. | |
| 2005/0192924 A1 | 9/2005 | Drucker et al. | |
| 2005/0257166 A1 | 11/2005 | Tu | |
| 2006/0242595 A1 | 10/2006 | Kizumi | |
| 2006/0250358 A1 | 11/2006 | Wroblewski | |
| 2006/0268020 A1 | 11/2006 | Han | |
| 2007/0209018 A1* | 9/2007 | Lindemann | 715/784 |
| 2008/0062141 A1* | 3/2008 | Chandhri | 345/173 |
| 2009/0219304 A1* | 9/2009 | Martin et al. | 345/684 |

OTHER PUBLICATIONS

"Espial", http://www.espial.com/index.php?action=products,evo_guide.

"New Features in Visual Paradigm for UML 2.2", http://www.visual-paradigm.com/highlight/highlightvpuml22.jsp#fastscroll.

International Search Report and Written Opinion Received for PCT Application No. PCT/US2008/068021, mailed on Dec. 11, 2008, 10 pages.

Office Action from the Patent Office of the State Intellectual Property Office of the People's Republic of China regarding Application No. 200880022421.7 dated Dec. 16, 2010, 13 pages.

Official Action from the Patent Office of the Russian Federation regarding Application No. 2009148506 dated Jan. 30, 2012.

Examiners Report from the Australian Patent Office regarding Application No. 2008268413 dated Mar. 21, 2012.

\* cited by examiner

TURBO-SCROLL MODE FOR RAPID DATA ITEM SELECTION

BACKGROUND

Computer users frequently deal with large amounts of content data, such as pictures, documents, and media content, such as music, television shows and movies. Whether the content is in a local data store or remotely located data store such as from a content provider service, when the number of items is large, it can be a difficult, frustrating and time-consuming task to select a particular item from the many available.

Known attempts to make it easier to find an item are generally alphabetic in nature. For example, in some systems a user types in one or more letters to advance the searchable material to items starting with that letter or those letters. However, many times a user searches via a remote control, whereby alphabetic input is not as straightforward as typing on a conventional keyboard, for example. Further, there still may be many items under a commonly used letter or letter combination, whereby the user still has to scroll through many items to find a desired one.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which when scrolling through items, a turbo-scroll mode is automatically entered in which the rate of scrolling through the items is increased, and visual cues are provided, e.g., cues corresponding to the type of item, and/or the type of scrolling. For example, scrolling may start upon receiving a directional button signal, with a turbo-scroll mode trigger corresponding to the directional button continuing to be actuated for a period of time, e.g., based on a timer. Releasing the directional button may terminate the turbo-scroll mode, unless course correction is active and scrolling (e.g., by re-actuating a directional button) resumes within a certain period of time.

The visual cues may correspond to text metadata indicative of a relative current position of scrolling through the items, such as displaying at least one letter indicative of an alphabetic position of scrolling through the items and/or displaying a list or filtered sub-list of label data for at least some items proximate the relative current position of scrolling through the items. Other visual cues may include a graphical position indicator indicative of a relative current position of scrolling through the items, a channel indicator or time indicator for an electronic program guide, fading the electronic program guide into a background representation thereof, and/or providing at least two letters indicative of an alphabetic position of scrolling through the items. A secondary sort along with an indicator of items that are in the secondary sort and proximate a current position of scrolling through the items may be provided as a further visual cue.

In one example aspect, a system comprises a scroll mechanism including a turbo-scroll mode that when activated, provides rapid scrolling through a set of items. In the turbo-scroll mode, the scroll mechanism also outputs one or more visual cues that indicate that rapid scrolling is active and that assist in finding a particular item within the set. The turbo-scroll mode is activated by means such as a directional button that triggers a timer, whereby continued actuation of the directional button for a period of time (as achieved by the timer) activates the turbo-scroll mode. Turbo-scroll mode may not be entered unless a sufficient quantity of items are available for scrolling. Further, the turbo-scroll mode may be deactivated when a course correction mode is not active and scrolling is not resumed within a course correction time.

In one example system, the scroll mechanism outputs the one or more visual cues by outputting text metadata indicative of a relative current position of scrolling through the items, at least one letter indicative of an alphabetic position of scrolling through the items, a list or filtered sub-list of label data for at least some items proximate the relative current position of scrolling through the items, a graphical position indicator indicative of a relative current position of scrolling through the items, a channel indicator or time indicator for an electronic program guide, and/or a faded background representation of a subset of the items being scrolled.

In one aspect, while scrolling through a set of items at a first rate, a triggering event causes the entering of a turbo-scroll mode in which scrolling continues through the set of items at a second rate that is faster than the first rate. Further, one or more visual cues are output to assist in stopping the scrolling at the second rate at or near a particular item within the set, in which the visual cues based on the type of item, the type of scrolling, or both the type of item and the type of scrolling. The triggering event may correspond to detecting that a scroll actuation mechanism continues to be activated for a period of time and that a sufficient quantity of items are available for scrolling at the second rate. Upon deactivation of the scroll actuation mechanism, when a course correction mode is not active, the turbo-scroll mode is exited. If the course correction mode is active and scrolling is resumed within a course correction time, scrolling is resumed in the turbo-scroll mode.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards assisting users to locate an item of content within a large amount of content by automatically changing a scrolling mode in an intelligent way. In one example, the changed scrolling mode scrolls through items faster while providing visual cues that help a user in locating a particular item. For purposes of simplification, this mode is referred to as "turbo" or "turbo-scroll" mode, although it is feasible to have multiple such turbo-scroll modes, such as a different turbo-scroll mode for each type of content, different modes for different amounts of content, and so forth.

As will be understood, various examples are shown herein that facilitate the above concepts and aspects. For example, content in the form of music (songs or albums), television shows and movies are used to correlate turbo-scrolling with visual cues. Further, examples of both horizontal scrolling and vertical scrolling are shown, depending on the items being scrolled through and/or the type of scrolling (e.g., content-based or time-based). However, these are only non-limiting examples for the purposes of describing the technology. As such, the present invention is not limited to any particular embodiments, aspects, concepts, protocols, formats, structures, functionalities or examples described herein. Rather, any of the embodiments, aspects, concepts, protocols, formats, structures, functionalities or examples described herein are non-limiting, and the present invention may be used various ways that provide benefits and advantages in computing and user search interface technology in general.

Figure 1:
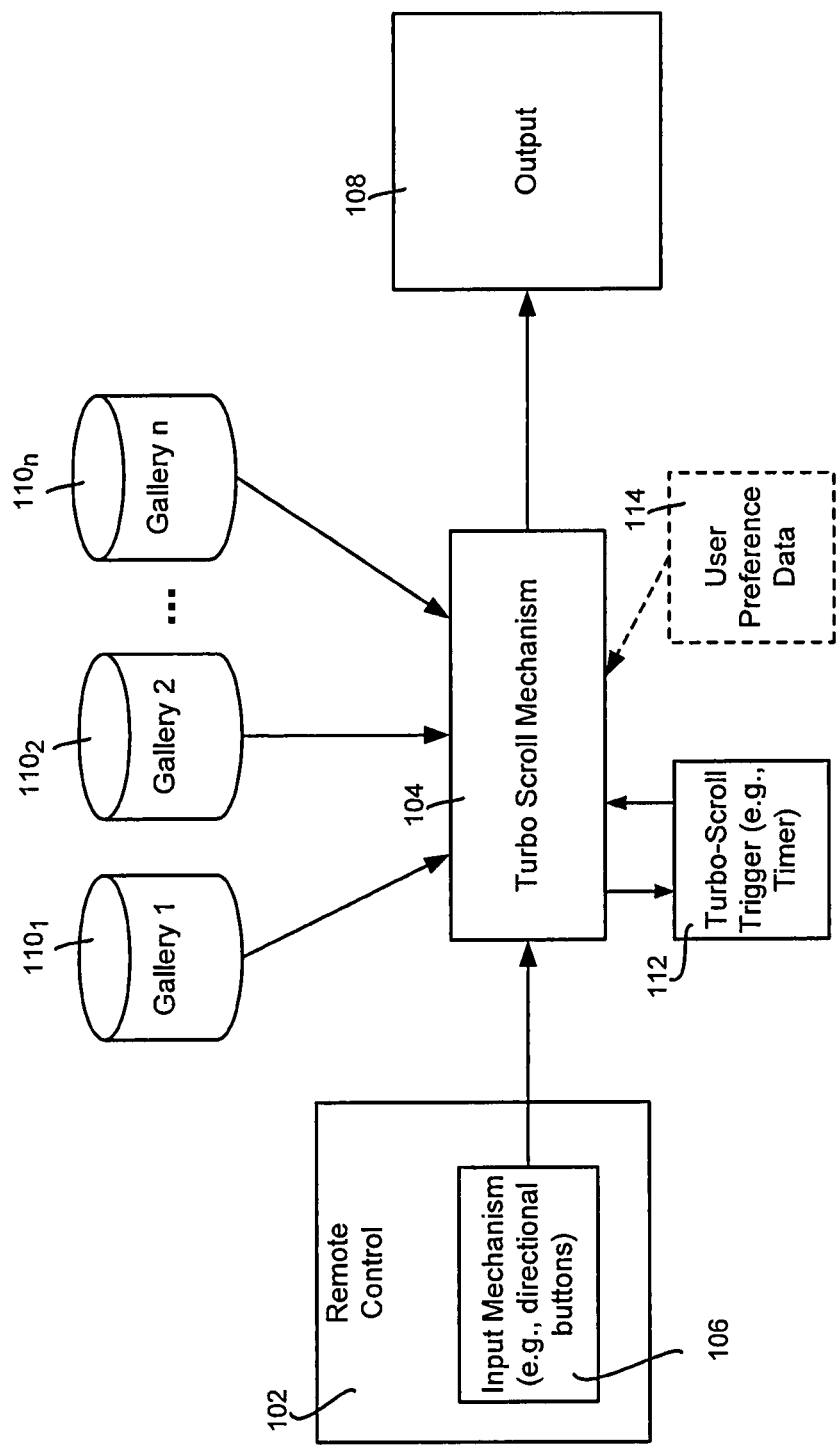
FIG. 1 is a block diagram representing example components for triggering a turbo-scroll mode.

Turning to FIG. 1, there is shown a block diagram representing general concepts related to operating a device in a turbo-scroll mode when appropriate. Examples of such devices include computer-based devices, as well as media content devices such as television sets, set-top boxes, and so forth. In general, any interactive device that allows selection from relatively large sets of data may benefit from the technology described herein.

In general, an input device such as a remote control 102 has its signals fed to a turbo-scroll mechanism 104, which may be part of a larger user interface. The input device contains an input mechanism 106, including at least one button that triggers scrolling operations, typically a directional button (left or right for horizontal scrolling, up or down for vertical scrolling). Based on the input, appropriate output 108 is displayed as being scrolled through, such as lists of content items from within one or more local or remote galleries $110_1$-$110_n$.

As represented in FIG. 1, a turbo-scroll trigger 112, such as a timer-based mechanism, enters the turbo-scroll mechanism 104 into a turbo-scroll mode, instead of a conventional scrolling mode. For example, if the user holds down a scrolling button for a period of time, and the content items otherwise qualify for turbo-scroll mode (e.g., there is a sufficient number of them to where turbo-scroll mode is beneficial), the turbo-scroll mechanism 104 enters into the turbo-scroll mode, which in general scrolls faster than a regular mode; effects such as acceleration and deceleration may be used when changing the scrolling speed.

Various factors can be used to determine whether to enter a turbo-scroll mode, as well as how that mode operates. For example, in one implementation, there may be a threshold value based on the number of content items in a gallery (or number of pages required to show those items) before turbo-scroll mode can occur. As another example, the time it takes to enter the turbo-scroll mode (how quickly faster scrolling occurs) may be determined according to the size of gallery, that is, the number of content items therein. As yet another example, the speed of scrolling may be determined according to the size of gallery, that is, the number of content items therein. Defaults and/or user preference data 114 may be used for the various factors, parameters, thresholds and the like. Defaults may be varied for user persona, e.g., a "beginner" user may be given a slower scroll speed than an "experienced" user, at least for a period of time.

In another alternative operating mode, turbo scrolling may accelerate and/or decelerate, such as based on a timer. In general, the user can automatically be taken into another broader or faster level of scrolling upon turbo scrolling for a certain period of time. For example, the longer the period of time the user stays in turbo scroll mode, the faster the scrolling becomes. It is also possible to slow scrolling such as when the user is approaching the end of a set of scrolled items. The acceleration and/or deceleration may be gradual (e.g., linear or another function) or in discrete speed change steps. By way of example, in an electronic program guide, the user may first turbo scroll by fragments of days, then if scrolling continues beyond some time limit, the turbo scroll changes to scroll by full days. Such an effect may happen automatically based on a timer.

Further, the visual aspects of turbo-scroll mode may be varied, such as according to the type of content, how the user has chosen to present the content items, and so forth. While it is feasible to show actual items as they are scrolled over, animations that show movement as well as metadata may be shown instead, or in addition to, to help a user scroll to a desired item.

Figure 2:
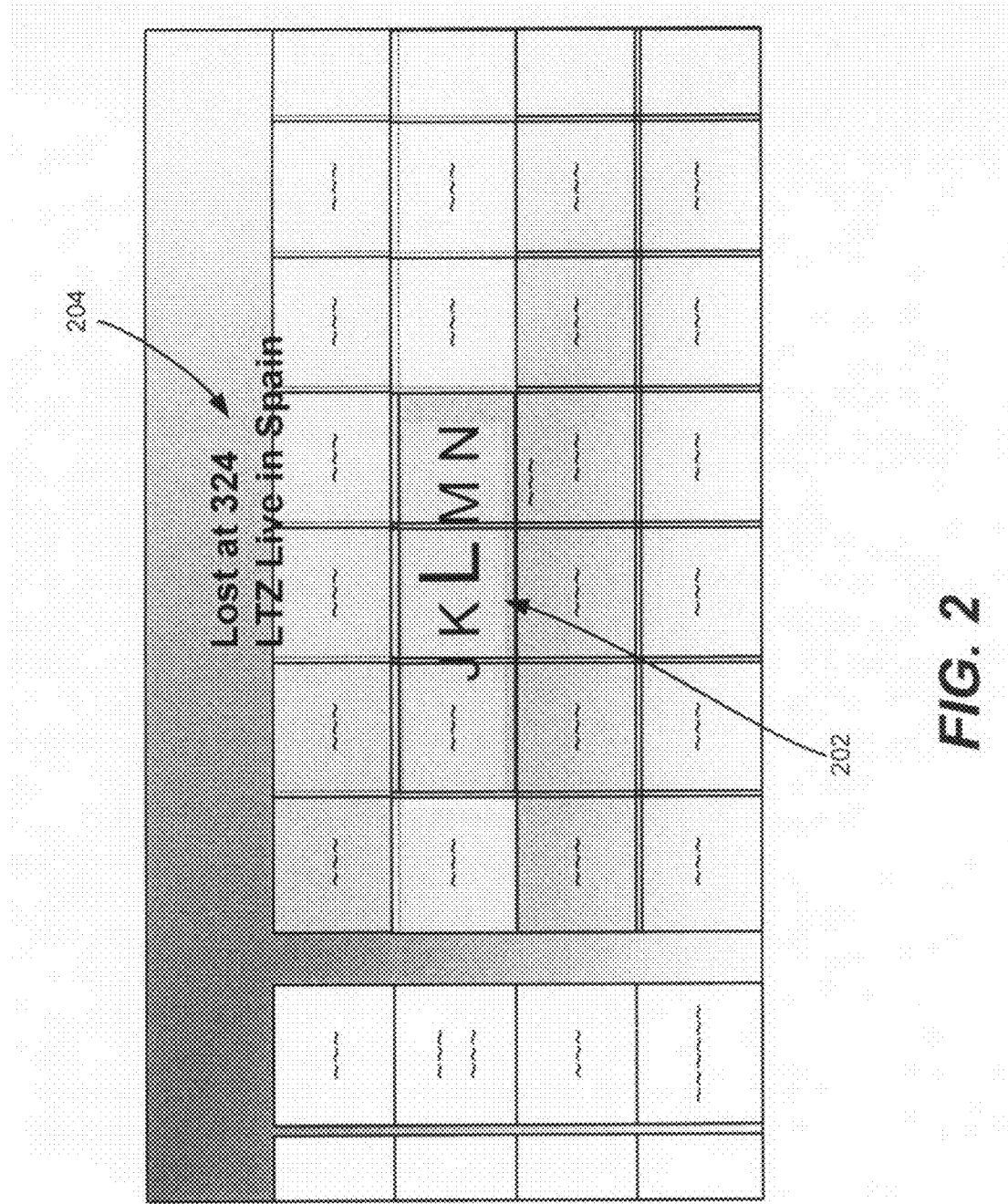
FIGS. 2-5 are example representations of example visual cues that may be provided while in a turbo-scroll mode.

For example, when scrolling through record albums as generally represented in FIG. 2, the user may be given metadata such as an alphabetical indication 202 (the large capital letter "L") as to where the user is currently positioned within the full set of content. Also shown in FIG. 2 is other metadata in the form text 204 that helps guide the user. A typical example of such textual metadata comprises labels for the items under the current letter, such as artist, title or genre labels, and/or the like.

In this particular example, as the user scrolls horizontally through an alphabet, the letters are displayed in a center-locked list 202 where the current position is the letter in the center, which is slightly enlarged. In this embodiment, a list 204 of information relevant to the center-locked letter is also displayed. For example, if the center locked letter is "L," a list or filtered sub-list of media starting with "L" is displayed above the letter. The list may be recently-selected media starting with that letter, or based on some other criteria, such as most popular, most frequently selected, and so forth.

Note that while single letter groupings are exemplified in FIG. 2, different groupings are feasible. For example, a letter with a large number of items may be broken up into two letter groupings, e.g., "LA . . . " "LE . . . " and so forth. Groupings can also be numerically or otherwise divided, e.g., so that there are no more than fifty items per group.

Thus, the output displays relevant metadata to the user as the user enters the turbo-scroll mode. For example, in FIG. 3, the user moves left or right in a screen moving past cells of an electronic program guide 300. As the user continues to scroll, the system intelligently switches into turbo scroll mode. In this mode, the electronic program guide or other user interface data is faded into the background, and the cursor (a position indicator) speeds up its scrolling. To help guide the user, metadata appears indicating the user's high level place in the data set. For example, in an electronic program guide as in FIG. 3, the day of the week, date, and time corresponding to the cursor's current position may appear as large text descriptions.

These large text blocks are updated as the user continues to turbo scroll. When the user has reached the right high-level position in the data set, the user can stop (e.g., release the button) and reenter normal scrolling.

Figure 4:
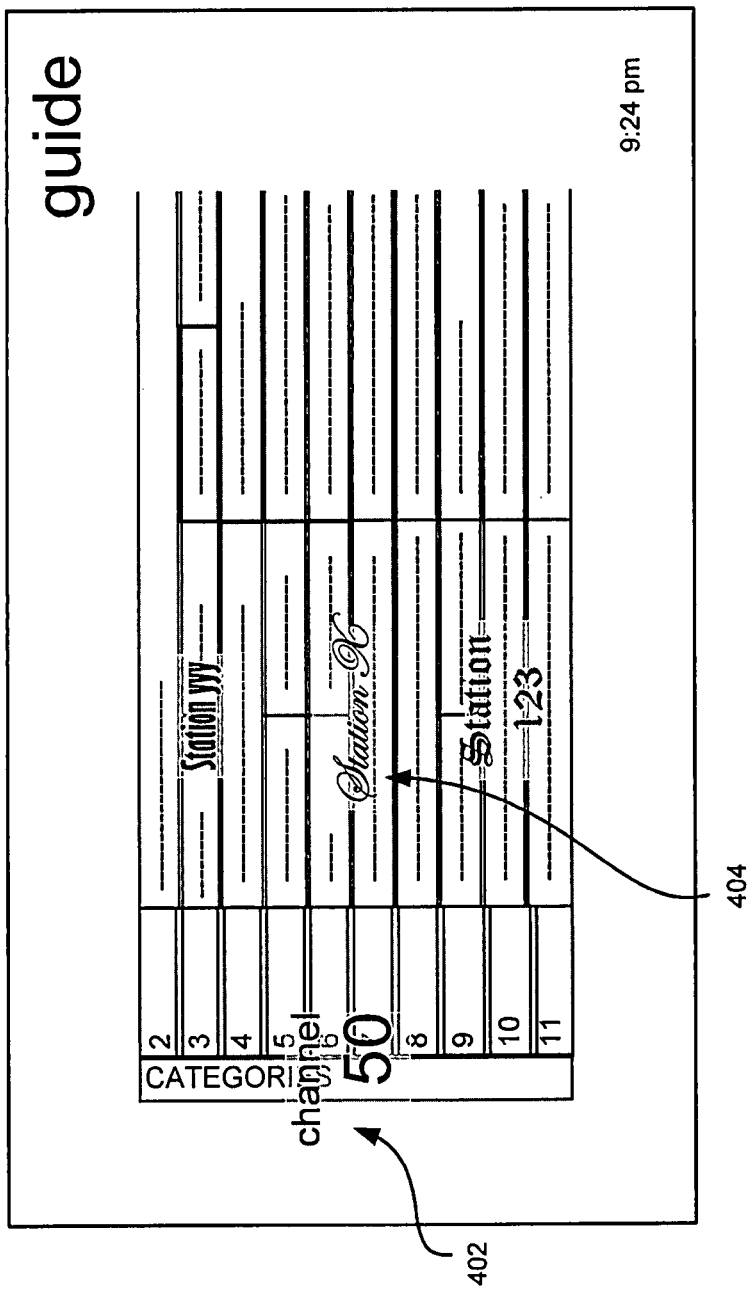

FIG. 4 is an alternative electronic program guide scrolling operation in which the scrolls vertically and has entered turbo-mode. In this example, the metadata corresponds to alpha-numeric text 402 representing a current channel, and an image 404 displayed, such as a brand or other icon/logo identifying the channel that is currently being turbo scrolled over.

Figure 5:
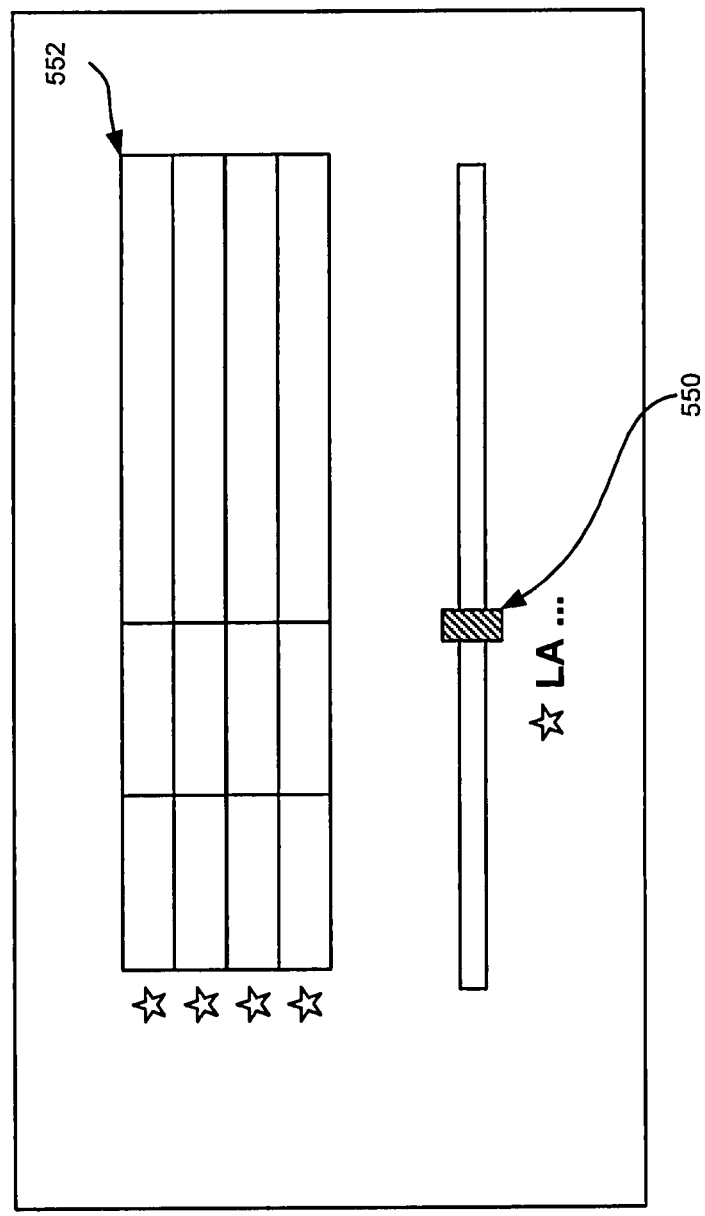

FIG. 5 provides yet another example of visual cues that may be used with turbo scrolling. In FIG. 5, a graphical position indicator 550 such as a scrollbar, slider bar (which may be interactive or passive) can show relative scroll position within a gallery. FIG. 5 represents another visual cue and scrolling concept, namely a secondary sort. In FIG. 5, movies are the items being scrolled, for example, with a secondary sort as to which movies starting with "LA" are rated "three stars;" corresponding further information (e.g., text metadata) about those movies is shown in the display area 552.

Figure 6:
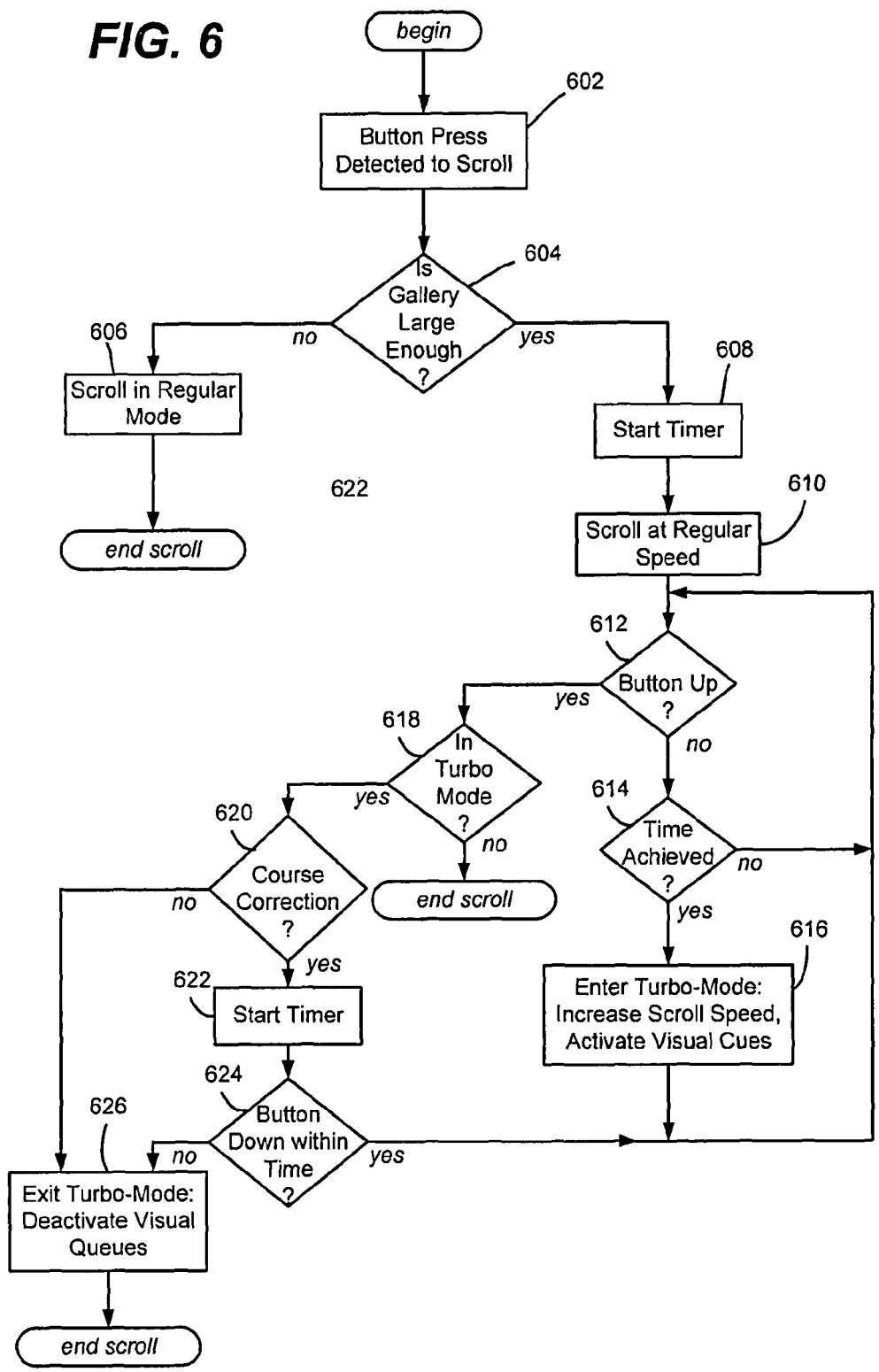
FIG. 6 is a flow diagram representing example steps taken with respect to entering and exiting a turbo-scroll mode.

FIG. 6 is a flow diagram representing example steps that may be taken to operate a turbo-scrolling mechanism, beginning at step 602 where a user presses a button (e.g., a directional button) for the purpose of scrolling while in a scroll-enabled state. Step 604 represents evaluating whether turbo-scroll may be enabled according to some criterion, such as whether the gallery contains enough items (or pages of items) to warrant turbo-scrolling; e.g., when there are too few items in a gallery, the user would not benefit much from faster scrolling, and faster scrolling would likely be annoying to many users. Other criteria besides quantity may be used, such as type of items, user preferences, and so forth.

If the criterion or criteria is not met at step 604, e.g., the gallery is not large enough, step 606 is executed, which represents scrolling in regular mode. Scrolling ends at some point, such as when the user releases the directional button, reaches a gallery end (assuming wrap-around scrolling is not in use), and so forth. Selection or further scrolling may occur at this time.

Step 604 branches to step 608 when turbo-scrolling is allowed. However, turbo-scrolling needs to be triggered in some way, which in this example is via a timer. Other mechanisms (e.g., a secondary button or double-click are feasible), but a timer provides an intuitive and intelligent way to change modes.

Step 610 represents scrolling at the regular speed, until either the user releases the button (step 612) or the timer triggers the turbo-scroll mode at step 614. If the button is released at step 612 and the system has not yet entered turbo-scroll mode, scrolling ends as with conventional scrolling, until further user action.

If turbo-scrolling is triggered before the button is released (by the timer in this example such as reaching a threshold time on the order of one or two seconds) as evaluated at step 614, step 616 is executed to enter the turbo scroll mode. In this example, entering turbo-scroll mode includes increasing the scroll speed, and typically includes activating the visual cues such as animation, metadata display and so forth. Another indication of turbo-scroll mode is that the primary list of items fades to the background, behind the visual cues. Note that scrolling occurs in real time, whereby the text data matches the focus spot, however the icons, thumbnails or other images representing the actual items are not necessarily visually repositioned at the fast rate of scrolling.

As represented in FIG. 6, turbo-mode scrolling continues at least until the button is released as detected by step 612. Note that other termination mechanisms may apply, e.g., the end of the list of items being reached, however such other mechanisms are omitted from FIG. 6 for purposes of brevity.

If at step 612 the button up is detected, step 618 is executed as described above to determine whether the user released the button while in turbo-scroll mode. This time in the example, the system is in turbo-scroll mode, whereby step 618 branches to step 620, where another feature, referred to as course correction, may be evaluated.

Figure 3:
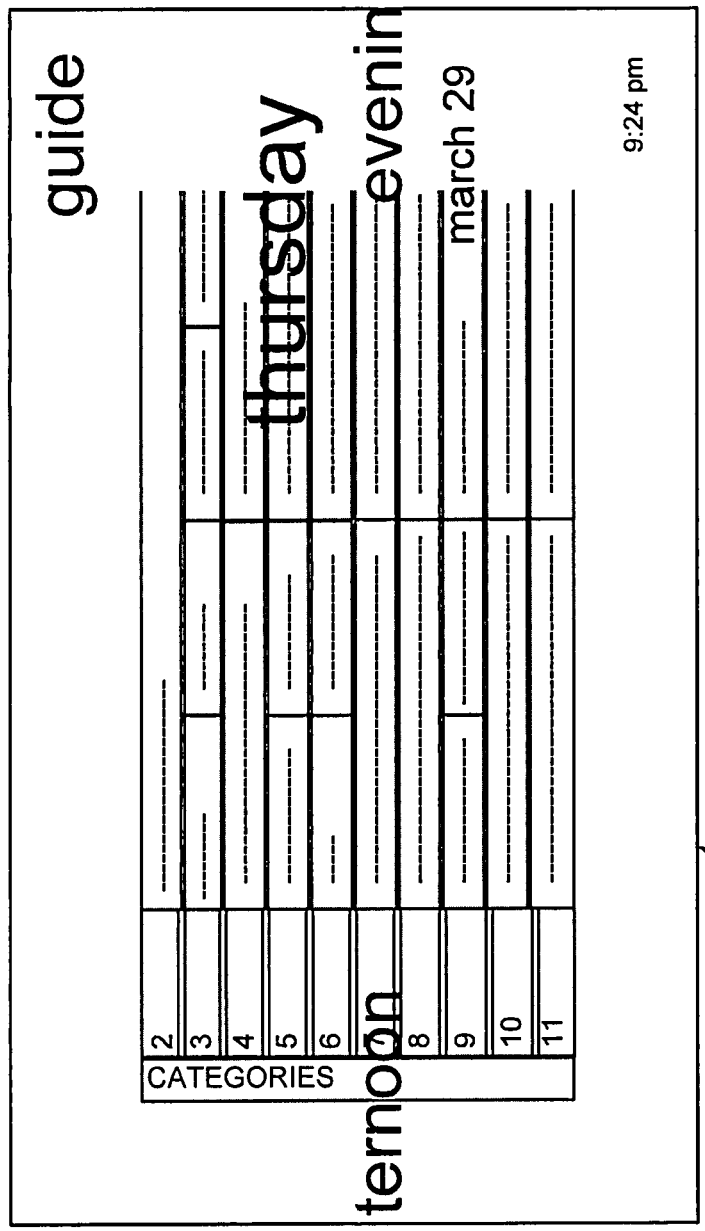

More particularly, when exiting turbo-scroll mode, certain lists of items (particularly time-based lists such as the electronic program guide 300 represented in FIG. 3 in which large blocks of time are scrolled) tend to be over-scrolled by users. When active, such as for certain types of lists, course correction allows the system to remain in turbo-scroll mode for a period of time after the directional button is released, whereby the user can back-up or resume forward scrolling while still in turbo-scroll mode. Steps 620, 622 and 624 facilitate remaining in the turbo-scroll mode if the user resumes scrolling within a course correction expiration time. Note that in this example, scrolling may resume in either direction, but directional scrolling may be limited by requiring a certain button (or one of a certain set of buttons) to be activated at step 624.

With respect to over-scrolling, it is also feasible to jump back a certain amount based on typical users' reflex times. However, in an implementation described herein, over-scrolling is prevented to an extent by anticipating in the other direction, that is, by sliding into focus what user first sees with respect to the visual cues.

Returning to FIG. 6, if course correction mode is not available for a particular gallery or type of scrolling (step 620), or the user does not resume scrolling within the course correction time (step 624), turbo-mode is exited at step 626. Scrolling thus ends and the system awaits further user input, which may be additional "slow" scrolling corresponding to the user restarting the process at step 602, unless and until turbo-scrolling is again activated at step 616.

Exemplary Operating Environment

Figure 7:
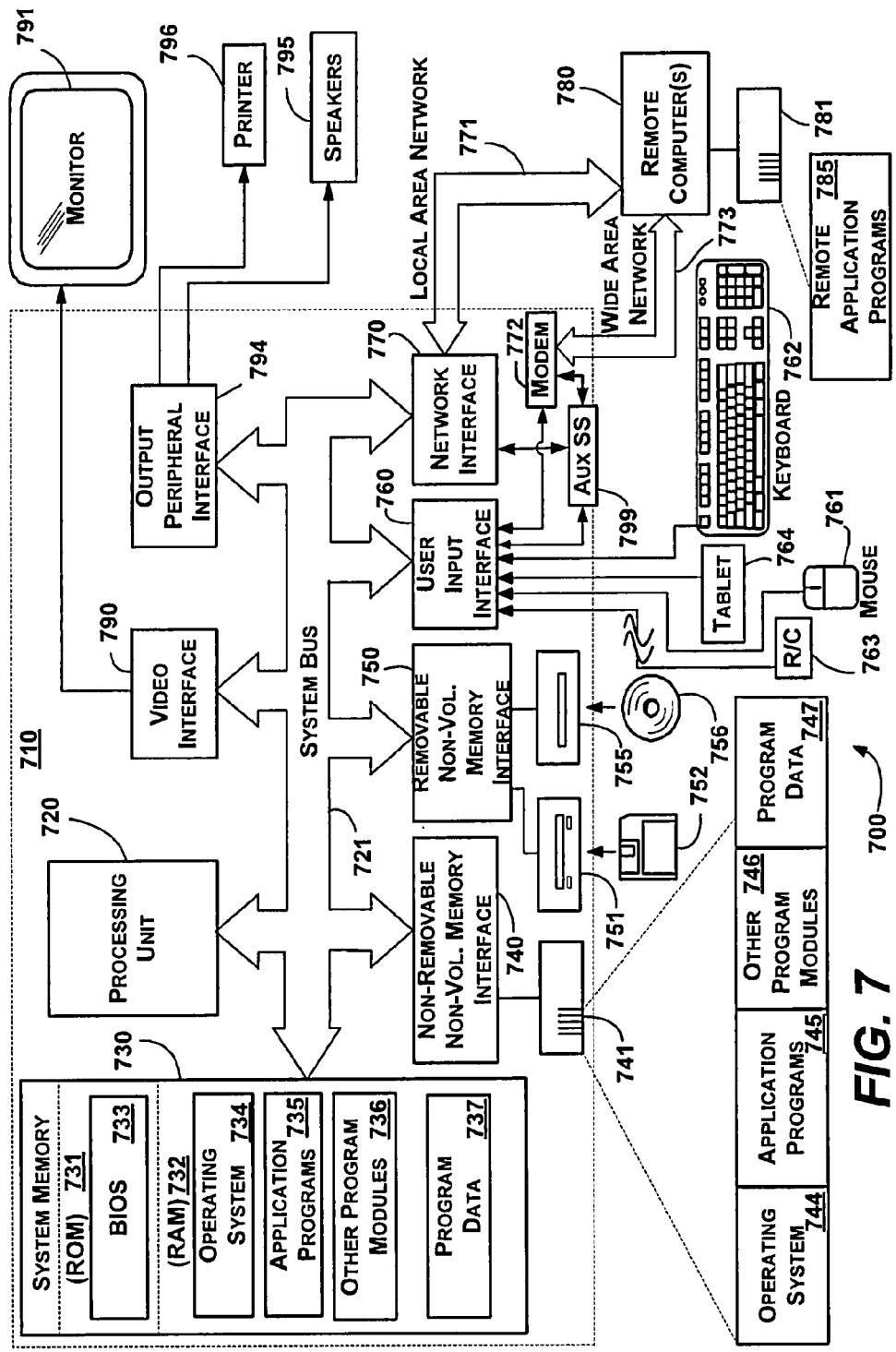
FIG. 7 shows an illustrative example of a general-purpose network computing environment into which various aspects of the present invention may be incorporated.

FIG. 7 illustrates an example of a suitable computing system environment 700 on which the turbo-scrolling examples represented in FIGS. 1-6 may be implemented, such as on a remote-controlled media center personal computer. The computing system environment 700 is only one example of a suitable computing environment and is not intended to suggest any limitation as to the scope of use or functionality of the invention. Neither should the computing environment 700 be interpreted as having any dependency or requirement relating to any one or combination of components illustrated in the exemplary operating environment 700.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 7, an exemplary system for implementing various aspects of the invention may include a general purpose computing device in the form of a computer 710. Components of the computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 710 typically includes a variety of computer-readable media. Computer-readable media can be any available media that can be accessed by the computer 710 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 710. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736 and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media, described above and illustrated in FIG. 7, provide storage of computer-readable instructions, data structures, program modules and other data for the computer 710. In FIG. 7, for example, hard disk drive 741 is illustrated as storing operating system 744, application programs 745, other program modules 746 and program data 747. Note that these components can either be the same as or different from operating system 734, application programs 735, other program modules 736, and program data 737. Operating system 744, application programs 745, other program modules 746, and program data 747 are given different numbers herein to illustrate that, at a minimum, they are different copies. A user may enter commands and information into the computer 710 through input devices such as a tablet, or electronic digitizer, 764, a remote control (R/C) 763, a keyboard 762 and pointing device 761, commonly referred to as mouse, trackball or touch pad. Other input devices not shown in FIG. 7 may include a joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. The monitor 791 may also be integrated with a touch-screen panel or the like. Note that the monitor and/or touch screen panel can be physically coupled to a housing in which the computing device 710 is incorporated, such as in a tablet-type personal computer. In addition, computers such as the computing device 710 may also include other peripheral output devices such as speakers 795 and printer 796, which may be connected through an output peripheral interface 794 or the like.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include one or more local area networks (LAN) 771 and one or more wide area networks (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760 or other appropriate mechanism. A wireless networking component 774 such as comprising an interface and antenna may be coupled through a suitable device such as an access point or peer computer to a WAN or LAN. In a networked environment, program modules depicted relative to the computer 710, or portions thereof, may be stored in the remote memory storage device. By way of example, and not limitation, FIG. 7 illustrates remote application programs 785 as residing on memory device 781. It may be appreciated that the network connections shown are exemplary and other means of establishing a communications link between the computers may be used.

An auxiliary subsystem 799 (e.g., for auxiliary display of content) may be connected via the user interface 760 to allow data such as program content, system status and event notifications to be provided to the user, even if the main portions of the computer system are in a low power state. The auxiliary subsystem 799 may be connected to the modem 772 and/or network interface 770 to allow communication between these systems while the main processing unit 720 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. At least one computer-readable storage medium storing computer-executable instructions that, when executed by a processor of a computing device, cause the computing device to perform steps comprising:
   displaying a subset of a set of items via a user interface;
   scrolling through the set of items in a first direction at a first scrolling rate in response to user input;
   activating a rapid scrolling mode in response to determining that the scrolling through the set of items in the first direction at the first scrolling rate has continued for a threshold time and determining that the set of items includes at least a threshold number of items, wherein the rapid scrolling mode provides rapid scrolling through the set of items in the first direction at a second scrolling rate that is faster than the first scrolling rate;
   determining a group of items corresponding to at least one of recently-selected items from the set of items or frequently-selected items from the set of items;
   outputting, in the rapid scrolling mode via the user interface, visual cues indicative of a relative current position of the rapid scrolling through the set of items, wherein:
      the subset of the set of items is displayed in the user interface as a background representation behind the visual cues during the rapid scrolling, and
      the visual cues identify items from the group of items that are proximate the relative current position of the rapid scrolling through the set of items to assist in stopping the rapid scrolling at or near a particular item from the group of items;
   stopping the rapid scrolling through the set of items in response to user input; and
   activating a course correction mode for a certain period of time after the stopping of the rapid scrolling, wherein:
      the course correction mode enables rapid scrolling to resume in the first direction at the second scrolling rate, without scrolling at the first scrolling rate, when user input to scroll in the first direction is received within the certain period of time,
      the course correction mode enables rapid scrolling in a second direction at the second scrolling rate, without scrolling at the first scrolling rate, when user input to scroll in the second direction is received within the certain period of time, and
      the rapid scrolling mode is exited to enable scrolling at the first scrolling rate in both the first direction and the second direction when user input to scroll is not received within the certain period of time.

2. The at least one computer-readable storage medium of claim 1, wherein the visual cues comprise text metadata identifying items from the group of items.

3. The at least one computer-readable storage medium of claim 2, wherein the text metadata comprises titles of items from the group of items.

4. The at least one computer-readable storage medium of claim 1, wherein the visual cues comprise images corresponding to items from the group of items.

5. The at least one computer-readable storage medium of claim 1, wherein the frequently-selected items are popular media items located in a remote data store of a content provider service.

6. The at least one computer-readable storage medium of claim 1, further storing computer-executable instructions for:
   outputting, in the rapid scrolling mode via the user interface, a graphical scrollbar and a graphical position indicator indicative of the relative current position of the rapid scrolling through the set of items.

7. The at least one computer-readable storage medium of claim 1, wherein the visual cues comprise channel indicators for an electronic program guide indicative of a numeric position of the rapid scrolling through the set of items.

8. The at least one computer-readable storage medium of claim 1, wherein the visual cues comprise text indicative of an alphabetic position of the rapid scrolling through the set of items.

9. The at least one computer-readable storage medium of claim 1, further storing computer-executable instructions for:
   outputting, in the rapid scrolling mode via the user interface, a display area including information corresponding to certain items from the group of items that are proximate the relative current position of the rapid scrolling through the set of items.

10. The at least one computer-readable storage medium of claim 9, wherein the certain items are items from the group of items that have a certain rating.

11. The at least one computer-readable storage medium of claim 1, further storing computer-executable instructions for:
    slowing the rapid scrolling through the set of items when approaching the end of the set of items.

12. A computing system comprising:
    a processor for executing computer-executable instructions; and
    memory storing computer-executable instructions that, when executed by the processor, cause the computing system to perform a method comprising:
       displaying a subset of a set of items via a user interface;
       scrolling through the set of items in a first direction at a first scrolling rate in response to user input;
       activating a rapid scrolling mode in response to determining that the scrolling through the set of items in the first direction at the first scrolling rate has continued for a threshold time and determining that the set of items includes at least a threshold number of items, wherein the rapid scrolling mode provides rapid scrolling through the set of items in the first direction at a second scrolling rate that is faster than the first scrolling rate;
       determining a group of items corresponding to at least one of recently-selected items from the set of items or frequently-selected items from the set of items;

outputting, in the rapid scrolling mode via the user interface, visual cues indicative of a relative current position of the rapid scrolling through the set of items, wherein:
- the subset of the set of items is displayed in the user interface as a background representation behind the visual cues during the rapid scrolling, and
- the visual cues identify items from the group of items that are proximate the relative current position of the rapid scrolling through the set of items to assist in stopping the rapid scrolling at or near a particular item from the group of items;

stopping the rapid scrolling through the set of items in response to user input; and activating a course correction mode for a certain period of time after the stopping of the rapid scrolling, wherein:
- the course correction mode enables rapid scrolling to resume in the first direction at the second scrolling rate, without scrolling at the first scrolling rate, when user input to scroll in the first direction is received within the certain period of time,
- the course correction mode enables rapid scrolling in a second direction at the second scrolling rate, without scrolling at the first scrolling rate, when user input to scroll in the second direction is received within the certain period of time, and
- the rapid scrolling mode is exited to enable scrolling at the first scrolling rate in both the first direction and the second direction when user input to scroll is not received within the certain period of time.

13. The computing system of claim 12, wherein the rapid scrolling mode enables both horizontal scrolling and vertical scrolling at the second scrolling rate.

14. The computing system of claim 12, wherein the visual cues comprise at least one of:
text metadata identifying items from the group of items,
titles of items from the group of items,
images corresponding to items from the group of items, or
channel indicators for an electronic program guide.

15. The computing system of claim 12, wherein the memory further store computer-executable instructions for:
outputting, in the rapid scrolling mode via the user interface, a display area including information corresponding to certain items from the group of items that are proximate the relative current position of the rapid scrolling through the set of items.

16. The computing system of claim 15, wherein the certain items are items from the group of items that have a certain rating.

17. The computing system of claim 15, wherein:
the user interface is an electronic program guide, and
the rapid scrolling mode enables both rapid scrolling through the set of items based on channels associated with the items and rapid scrolling through the set of items based on dates and times associated with the items.

18. A method comprising:
displaying, by a computing device, a subset of a set of items via a user interface;
scrolling, by the computing device, through the set of items in a first direction at a first scrolling rate in response to user input;
activating, by the computing device, a rapid scrolling mode in response to determining that the scrolling through the set of items in the first direction at the first scrolling rate has continued for a threshold time and determining that the set of items includes at least a threshold number of items, wherein the rapid scrolling mode provides rapid scrolling through the set of items in the first direction at a second scrolling rate that is faster than the first scrolling rate;
determining, by the computing device, a group of items corresponding to at least one of recently-selected items from the set of items or frequently-selected items from the set of items;
outputting, by the computing device in the rapid scrolling mode via the user interface, visual cues indicative of a relative current position of the rapid scrolling through the set of items, wherein:
- the subset of the set of items is displayed in the user interface as a background representation behind the visual cues during the rapid scrolling, and
- the visual cues identify items from the group of items that are proximate the relative current position of the rapid scrolling through the set of items to assist in stopping the rapid scrolling at or near a particular item from the group of items;

stopping, by the computing device, the rapid scrolling through the set of items in response to user input; and
activating, by the computing device, a course correction mode for a certain period of time after the stopping of the rapid scrolling, wherein:
- the course correction mode enables rapid scrolling to resume in the first direction at the second scrolling rate, without scrolling at the first scrolling rate, when user input to scroll in the first direction is received within the certain period of time,
- the course correction mode enables rapid scrolling in a second direction at the second scrolling rate, without scrolling at the first scrolling rate, when user input to scroll in the second direction is received within the certain period of time, and
- the rapid scrolling mode is exited to enable scrolling at the first scrolling rate in both the first direction and the second direction when user input to scroll is not received within the certain period of time.

19. The method of claim 18, further comprising:
outputting, by the computing device in the rapid scrolling mode via the user interface, a display area including information corresponding to certain items from the group of items that are proximate the relative current position of the rapid scrolling through the set of items.

20. The method of claim 19, wherein the certain items are items from the group of items that have a certain rating.

* * * * *